(12) United States Patent
Chen Kaidi

(10) Patent No.: US 12,143,405 B2
(45) Date of Patent: Nov. 12, 2024

(54) MALICIOUS COMPUTING ATTACKS DURING SUSPICIOUS DEVICE BEHAVIOR

(71) Applicant: PAYPAL, INC., San Jose, CA (US)

(72) Inventor: George Chen Kaidi, Singapore (SG)

(73) Assignee: PAYPAL, INC., San Jose, CA (US)

(*) Notice: Subject to any disclaimer, the term of this patent is extended or adjusted under 35 U.S.C. 154(b) by 735 days.

(21) Appl. No.: 17/333,946

(22) Filed: May 28, 2021

(65) Prior Publication Data
US 2022/0385676 A1    Dec. 1, 2022

(51) Int. Cl.
| | |
|---|---|
| *H04L 29/06* | (2006.01) |
| *G06F 21/54* | (2013.01) |
| *G06N 5/04* | (2023.01) |
| *G06N 20/00* | (2019.01) |
| *H04L 9/40* | (2022.01) |

(52) U.S. Cl.
CPC ......... *H04L 63/1416* (2013.01); *G06F 21/54* (2013.01); *G06N 5/04* (2013.01); *G06N 20/00* (2019.01); *H04L 63/1491* (2013.01); *G06F 2221/033* (2013.01); *G06F 2221/2133* (2013.01)

(58) Field of Classification Search
CPC ............ G06F 21/54; G06F 2221/033; G06F 2221/2133; G06F 21/554; G06N 5/04; G06N 20/00; H04L 63/1416; H04L 63/1491
See application file for complete search history.

(56) References Cited

U.S. PATENT DOCUMENTS

| | | | | |
|---|---|---|---|---|
| 2014/0344927 A1* | 11/2014 | Turgeman | ............... | G06F 21/31 726/22 |
| 2017/0195356 A1* | 7/2017 | Turgeman | ............... | H04L 63/08 |
| 2018/0075233 A1* | 3/2018 | Gray | .................... | H04L 63/1483 |
| 2018/0103047 A1* | 4/2018 | Turgeman | .......... | G06Q 20/4014 |
| 2018/0336348 A1* | 11/2018 | Ng | ........................... | G06F 21/52 |
| 2019/0141064 A1* | 5/2019 | Call | .................... | H04L 63/1483 |
| 2021/0097174 A1* | 4/2021 | Mandal | ................. | G06F 21/554 |
| 2021/0303696 A1* | 9/2021 | Weber | .................. | G06F 21/577 |

OTHER PUBLICATIONS

Datadome, "Bot detection: how to identify and block bot traffic to your websites, mobile apps, and APIs", [retrieved Nov. 28, 2020], Retrieved from the Internet <URL: https://datadome.co/bot-management-protection/bot-detection-how-to-identify-bot-traffic-to-your-website/>.

* cited by examiner

*Primary Examiner* — Joseph P Hirl
*Assistant Examiner* — Thomas A Gyorfi
(74) *Attorney, Agent, or Firm* — Haynes and Boone, LLP

(57) ABSTRACT

There are provided systems and methods for injecting computing code for detection of malicious computing attacks during suspicious device behavior. A service provider, such as an electronic transaction processor for digital transactions, may detect activities of a computing device when using computing services. The service provider may determine that those activities are suspicious or high risk. In order to determine if the computing device is being used by a malicious user, such as to perform an automated computing attack against the service provider, the service provider may determine one or more probes that may be inserted to a corresponding user interface displayable by the computing device. The probe may attempt to differentiate between real human users and automated and/or malicious users. Computing code for the probe may be injected into the computing code for the user interface and may be provided when the user interface is output.

20 Claims, 7 Drawing Sheets

You need an account for this purchase.
- ○ I already have an account
- ◉ I need to create an account (where available) ← 302

Country ← 304
*Country: [United Kingdom ▼]

Credit or Debit Card Information ← 306
*First Name: [            ]
(as it appears on card)
*Last Name: [            ]
(as it appears on card)
*Card Type: [Select Card ▼]
*Card Number: [            ]
*Expiry Date: [01 ▼] [2014 ▼]
*Card Security Code: [  ] [▭▭] What is this?

Hidden Placeholder ← 308

Billing Address ← 310
*Address line 1: [            ]
Address line 2: [            ]
*Town/City: [            ]
*Country: [            ▼]
*Postcode: [      ]

Contact Information ← 312
This information will only be used to contact you regarding your payment, if needed.
*Email Address: [            ]
*Home Phone Number [            ]              Privacy

Security Check ← 314
Type characters as shown in the box. Help
*Enter the code as [        ] ← 316
shown below:
[ d9e2y ] ← 318

In order to process your payment, we collects certain personal information from you which it holds in accordance with its Privacy Policy. For more information on this process, click Account Optional.

FIG. 3A

MALICIOUS COMPUTING ATTACKS DURING SUSPICIOUS DEVICE BEHAVIOR

TECHNICAL FIELD

The present application generally relates to digital data security through detecting malicious devices and users, and more particularly to injecting computing code for probing tests to web and application interfaces to detect scripted computing attacks and other malicious conduct.

BACKGROUND

Online service providers may provide services to different users, such as individual end users, merchants, companies, and other entities. When providing these services, the service providers may provide an online platform that may be accessible over a network, which may be used to access and utilize the services provided to different users. This may include logging in to an account, processing data via the services, and the like. However, as hackers and other malicious users or entities become more sophisticated, they may perform different computing attacks and other malicious conduct to compromise these communications. For example, attacking entities may use scripted bots that replay an attack numerous times and/or substitute different information during the attack, such as when executing a brute force attack. Other attacking entities may automate data entry and/or navigation through known webpages, application interfaces, and the like. Without identifying these attackers and performing remedial actions, the service provider may risk fraud, loss, and decreased customer trust or satisfaction. Thus, service providers require more robust and sophisticated manners of detecting suspicious and/or malicious activities to prevent breach or access by undesired or unintended entities.

BRIEF DESCRIPTION OF THE DRAWINGS

FIG. 3A is an exemplary user interface prior to injecting computing code for a probing test to detect if a malicious user is using a computing device, according to an embodiment;

Figure 1:
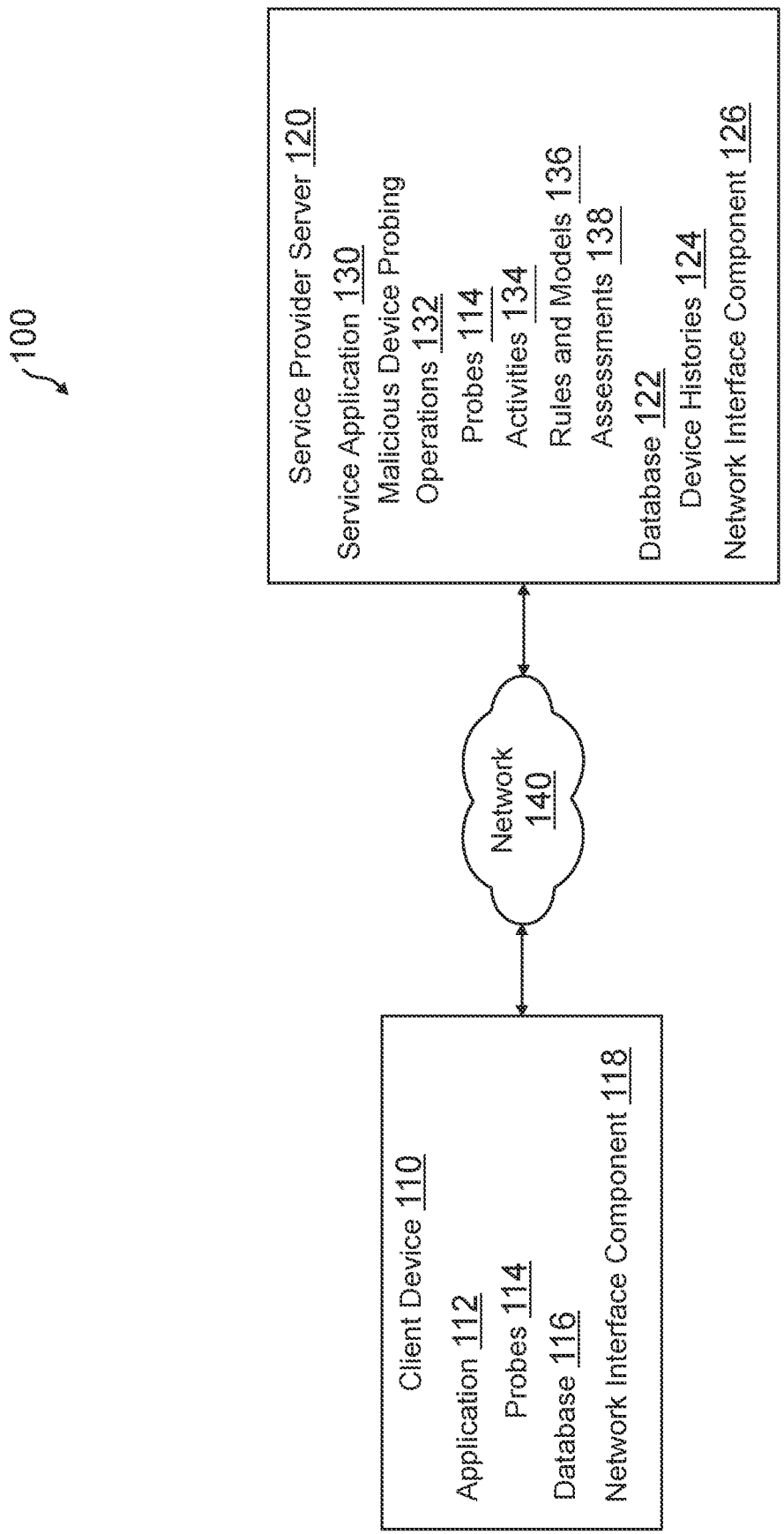
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for injecting computing code for detection of malicious computing attacks during suspicious device behavior. Systems suitable for practicing methods of the present disclosure are also provided.

In network communications, such as between online platforms and systems for service providers and end users' client devices, electronic platforms network computing architecture that provide computing services to users and computing devices may face different types of computing attacks coming from malicious sources over a network. For example, a malicious actor may initiate a computing attack on the computing environment of the service provider, such as an eavesdropping attack, a password attack and/or account takeover, a web abuse (e.g., account enumeration, brute force attacks, SQL injection), or other type of computing attack that may compromise services (e.g., electronic transaction processing services) and/or expose data (personally identifiable information (PII) and/or funding source information) to the malicious actor. Computing attacks may be executed through automated computing bots or operations, such as executable scripts and bots that may quickly repeat computing attacks to try different data and/or overwhelm a system. These computing attacks may therefore lead to fraud and loss by the service provider. For example, a scripted bot that performs account enumeration may proceed through a list of potentially compromised account usernames, passwords, or other credentials. Other shell scripts may also automate other processes and operations, including program or application executables and interface form filling.

In order to assist in preventing or minimizing these computing attacks and other abuses, a service provider, in various embodiments, may utilize a multi-tiered or multi-level processing architecture and detection system that detects if a computing device may be used by a malicious actor, including users and scripts executed by those users. At a first tier or level, the service provider may implement and execute a detection and monitoring system to detect one or more activities by the computing device. The activities may be performed by the computing device with one or more services and/or platforms through one or more web interfaces (e.g., on webpages of the service provider) or through application interfaces (e.g., in mobile, rich Internet, or dedicated software applications). If these activities exceed a risk or fraud threshold, at a second tier or level, the service provider determines one or more probes or probing tests to detect if the computing device is operated by a malicious user (e.g., is a bot, executing a script, or performing a computing attack). Computing code for the probe is injected into existing code for the interface(s), webpages, or the like (e.g., as hypertext markup language (HTML) or extensible markup language (XML) code), and the further activities by the computing device are monitored, such as those interactions with the probe. Using the monitored activities, at a third tier or level, the service provider determines whether the computing device is likely being operated by a malicious user. If so, the service provider may execute remediation actions to prevent or revert the malicious conduct.

For example, a service provider may provide electronic transaction processing to entities through digital accounts, including consumers and merchants that may wish to process transactions and payments. Other service providers may also provide computing services, including email, social networking, microblogging, media sharing, messaging, business and consumer platforms, etc. In order to establish an account, these different users may be required to provide account details, such as a username, password (and/or other authentication credential, such as a biometric fingerprint, retinal scan, etc.), and other account creation details. The account creation details may include identification information to establish the account, such as personal information for a user, business or merchant information for another entity, or other types of identification information including a name, address, and/or other information. The entity may also be required to provide financial or funding source information, including payment card (e.g., credit/debit card) information, bank account information, gift card information, benefits/incentives, and/or financial investments, which may be used to process transactions. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services. However, malicious users, entities, and/or other computing devices (e.g., computing devices that may include malware, viruses, and the like that may be hijacked to automate computing attacks) may attempt to abuse the computing services and/or digital accounts in order to compromise sensitive data, which may lead to exploitation and/or unauthorized use by these malicious parties.

Thus, a service provider may execute one or more monitoring applications, bots, plugins, or applications configured to monitor activities of computing devices with the service provider's services and platforms. This may detect suspicious activities including failed login attempts, brute force login attempts or automated password enumeration, automated form filling and/or other automated data entry, excess separate logins and/or login attempts for different accounts, multiple form entry retrials and/or data entry, probing of system architecture and/or directory hierarchies, directory enumeration attempts, computing attacks on system resources, and the like. Further, other activities may indicate suspicious or malicious behavior of the computing device, such as those associated with authentication, lookup or retrieval of PII or other sensitive data (e.g., financial data), electronic transaction processing requests, and other services provided by the service provider. Based on the monitored activities, the service provider may determine whether those activities, alone or in combination, exceed a fraud or risk threshold. This threshold may be utilized with a rule-based or artificial intelligence (AI) engine and system that analyzed the monitored activities and determines a risk score or value that is compared to the threshold. For example, certain activities may be identified as high-risk activities or multiple activities may appear suspicious when being performed together or in sequence.

If the monitored activities exceed the risk threshold, the service provider may advance to a next level in order to identify whether the computing device is associated with a computing script and/or malicious user. Note that as used herein, exceeding the risk threshold can also mean meeting the risk threshold. Furthermore, targeted sampling for malicious device/user detection may be performed on a set or pool of network traffic that meets or exceeds a risk threshold and is deemed high risk. For example, during traffic spikes, a high-risk traffic pool toward an endpoint may be identified based on exceeding a risk threshold. However, deploying multiple probes and/or testing all of the high-risk traffic pool during a traffic spike may overly consume processing and/or network resources. Thus, a sampling of the high-risk traffic pool (e.g., 10% of the traffic) may be selected for deployment of probes and/or identification of whether the computing device is associated with a computing script and/or malicious user.

The service provider may include multiple different probes and/or probing tests of the computing device via one or more user interfaces (e.g., web interfaces of webpages and/or application interfaces). A probe may correspond to executable computing code that assists in identifying whether a real user or human is utilizing the computing device, or whether an automated script or operation is attempting to compromise the service provider's system and/or data. For example, a probe may correspond to a variation of a previous interface layout or a current interface layout, such as by adding a banner, animated or static image, or the like that affects page loading time and may affect scripts that rely on certain loading times. The variation may also correspond to moving, adding, and/or making transparent one or more buttons, data entry fields, menus, or interface icons, including those that execute processes, request data, or perform a navigation. In this regard, by changing an interface layout, a script may not select a correct button or an added button or may enter data to an incorrect field (e.g., by changing an ordering of data entry fields on the interface).

In other embodiments, a probe may include changing or varying a processing flow and/or navigation flow during a login attempt, electronic transaction processing, or other data processing request. This may also include a redirection to a different web interface or different application interface. Further, a computing macro may replay a display or data output, which may further confuse scripts but still lead to proper data entry by human users. In further embodiments, a probe may also cause movement of an interface focus, such as a focus selectable by a mouse for data entry, and/or a change of mouse speed. Other probes may include providing relevant information to a user (e.g., an interesting fact, video, sound clip, game or quiz, etc.), providing a tracking pixel via the interface and/or causing data output via a secondary interface that is required for the data processing flow, such as using an iframe or the like for displaying data and/or requesting data input (e.g., authentication information).

Once a probe is identified and selected for testing the computing device for malicious users and/or behavior, computing code for the probe may be retrieved and/or determined. The computing code is then injected and/or executed with the existing computing code for one or more current interfaces being viewed by the computing device, such as a web interface and/or application interface accessed by the computing device. In some embodiments, the probe and corresponding computing code may be selected based on behavior of the computing device and/or current interfaces accessed by the computing device. Further, the probe may be selected based on a certain processing flow being used and/or type of processing or navigation flow. Once the probe's computing code is injected into the interface's current computing code, the probe's computing code is executed to provide and cause output of the probe on the computing device and testing of the computing device for whether a malicious user is utilizing the computing device.

Once the probe is deployed, at a next level, the service provider may provide the corresponding interface to the computing device and monitor for interactions by the computing device with the probe and/or with the interface (e.g., a webpage or application interface). The interactions may include uses, data entry, selections, and the like that are associated with the probe and/or the other interface elements, fields, and data within the interface. For example, a valid human user may select a probe that corresponds to a larger or more attractive button, whereas a script may select the previous and/or hidden button based on the automated operations of the script. Similarly, where interface fields are rearranged, a script may incorrectly place data in certain fields. In some embodiments, the probe may cause a human user to spend additional time on a page, such as to solve a problem or read information provided to the user. Thus, a time to complete forms, fields, or requests on an interface in a processing flow may be slowed for valid human users but not changed for scripts, which may be indicative or fraud or malicious users. Conversely, when some fields are rearranged, load times are slowed, or other data is unpredictable, scripted bots may crash or have difficulty in completing an interface's form, provide the wrong information, or reload the interface, which may be indicative of a script and/or malicious user.

Once the interactions are received, the service provider may determine the additional activities by the computing device via the interface(s) and may determine whether the additional activities are indicative of a potential malicious user utilizing the computing device. For example, the additional activities may be compared to a baseline of activities for human users and/or scripts/malicious users. These may correspond to processing rules identifying threshold times by valid and malicious users. The rules may be based on past interaction times and/or times to perform the additional activities. In further embodiments, an AI model may be trained based on features for valid users and malicious users to make a predictive output or decision of whether the user is valid or malicious.

At a further optional level, if the activities from the interactions indicate a valid user and not malicious behavior, the service provider may not take remedial actions and/or prevent the computing device from taking further actions. The service provider may validate the computing device and may continue to monitor the computing device in the event that the activities led to a false positive that the user is valid and not malicious. However, if the additional activities exceed a threshold or baseline, or is predicted to be malicious, the service provider may instead take a remedial action. Those actions may include blocking an account used by the computing device, preventing an action executing by the computing device including those involved with a computing device or script, disconnecting or severing the computing device from a connection with the service provider and/or blocking a device identifier or IP address used by the device for network communications, issuing one or more retests of the computing device using the probes, further monitoring the computing device, or deploying a honeypot trap that attempts to capture more information about the computing device and/or malicious user. For example, in some embodiments, the service provider may also provide data that appears valid but may be used for tracking purposes to gain better knowledge of the malicious party, such as a honeypot webpage, interface, data, and/or operation that is not valid but may be used to determine the malicious user by querying the malicious user for additional data and/or receiving reentry or use of the honeypot data. Thus, the interface data may be changed quickly on the backend of the service provider so that data is not compromised when unauthorized or access or activities by a malicious user is detected.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a client device 110 and a service provider server 120 in communication over a network 140. Client device 110 may be utilized by a user to interact with service provider server 120 over network 140, where service provider server 120 may provide various computing services, data, operations, and other functions over network 140. In this regard, client device 110 may perform activities with service provider server 120 that may be suspicious and/or malicious. Service provider server 120 may issue probes and other probing tests of client device 110 in order to detect if client device 110 is executing an automated script, bot, or other automated computing attack.

Client device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client device 110 may be implemented as a communication device that may utilize appropriate hardware and software configured for wired and/or wireless communication with service provider server 120. For example, in one embodiment, client device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one device is shown, a plurality of devices may function similarly and/or be connected to provide the functionalities described herein.

Client device 110 of FIG. 1 contains an application 112, a database 116, and a network interface component 118. Application 112 may correspond to executable processes, procedures, and/or applications with associated hardware. In other embodiments, client device 110 may include additional or different modules having specialized hardware and/or software as required.

Application 112 may correspond to one or more processes to execute software modules and associated components of client device 110 to provide features, services, and other operations for a user over network 140, which may include accessing and displaying interfaces that may include probes deployed and provided by service provider server 120. In this regard, application 112 may correspond to specialized software utilized by a user of client device 110 that may be used to access a website or application (e.g., mobile application, rich Internet application, or resident software application) that may display one or more user interfaces that allow for interaction with service provider server 120. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 140, including retrieving website information, presenting the website information to the user, and/or communicating information to the website. However, in other embodiments, application 112 may include a dedicated application of service provider server 120 or other entity. Application 112 may be associated with account information, user financial information, and/or transaction histories. However, in further embodiments, different services may be provided via application 112, including social networking, media posting or sharing, microblogging, data browsing and searching, online shopping, and other services available through service provider server 120. Thus, application 112 may also correspond to different service applications and the like.

When using application 112, one or more user interfaces may allow a user, including automated bots and scripts that perform computing attacks on behalf of malicious users, to perform activities with service provider server 120. If these activities exceed a fraud or risk threshold, service provider server 120 may provide one or more of probes 114 via the user interfaces to client device 110, which may detect whether client device 110 is being used by a valid or malicious user. For example, client device 110 may take a certain amount of time to complete forms, fields, or requests on an interface, interact with probes 114, and/or to navigate to a new interface, which may be used to detect time differences between automated scripts or attacks and human users. In some embodiments, the interaction with probes 114 may be no interaction, such as if a valid user misses a hidden field or a malicious user does not select a newly presented and/or unique icon or button. Thus, application 112 may further perform additional interactions with probes 114 and/or user interface, which may generate further activities of computing device with service provider server 120. Based on whether these additional activities indicate fraud, an automated script or attack, and/or a malicious user, application 112 may be provided additional ones of probes 114, a remedial action may be taken, or, if the use of application 112 is valid, further access and/or use of services from service provider server 120.

Client device 110 may further include a database 116 stored on a transitory and/or non-transitory memory of client device 110, which may store various applications and data and be utilized during execution of various modules of client device 110. Database 116 may include, for example, identifiers such as operating system registry entries, cookies associated with application 112 and/or other applications, identifiers associated with hardware of client device 110, or other appropriate identifiers, such as identifiers used for payment/user/device authentication or identification, which may be communicated as identifying the user/client device 110 to service provider server 120. Moreover, database 116 may store malicious automated operations for scripts, bots, and computing attacks when client device 110 is utilized by a malicious user. However, when used by a valid user, other data may be stored in database 116. Additionally, local data necessary for rendering an interface may be stored in database 116.

Client device 110 includes at least one network interface component 118 adapted to communicate with service provider server 120. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency, infrared, Bluetooth, and near field communication devices.

Service provider server 120 may be maintained, for example, by an online service provider, which may provide operations for use of service provided by service provider server 120 including account and electronic transaction processing services. In this regard, service provider server 120 includes one or more processing applications which may be configured to interact with client device 110 to provide interfaces to client device 110, which may be used to output and display probing tests and other probes through interface elements and fields. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes a service application 130, a database 122, and a network interface component 126. Service application 130 may correspond to executable processes, procedures, and/or applications with associated hardware. In other embodiments, service provider server 120 may include additional or different modules having specialized hardware and/or software as required.

Service application 130 may correspond to one or more processes to execute modules and associated specialized hardware of service provider server 120 to provide service for account usage, digital electronic communications, electronic transaction processing, and the like. In this regard, service application 130 may correspond to specialized hardware and/or software used by a user associated with client device 110 to utilize one or more services. Service application 130 may correspond to electronic transaction processing, account, messaging, social networking, media posting or sharing, microblogging, data browsing and searching, online shopping, and other services available through service provider server 120. Service application 130 may be used by a user to establish an account and/or digital wallet, which may be accessible through one or more user interfaces, as well as view data and otherwise interact with the computing services of service provider server 120. In various embodiments, financial information may be stored to the account, such as account/card numbers and information. A digital token or other account for the account/wallet may be used to send and process payments, for example, through an interface provided by service provider server 120. The payment account may be accessed and/or used through a browser application and/or dedicated payment application, which may provide user interfaces for use of the computing services of service application 130.

Additionally, service application 130 may include malicious device probing operations 132 to detect malicious users and computing events that cause risk to service provider server 120. However, it is understood a separate system and/or application may instead provide malicious device probing operations 132. Service application 130 may detect if client device 110 is acting suspiciously, unlike human users (e.g., fast form filling, repeated authentication attempts, etc.), and/or maliciously (e.g., probing system infrastructures or directories, performing computing attacks, etc.). If so, malicious device probing operations 132 may determine one or more of probes 114 that may be used with the user interfaces and/or processing flows accessed and utilized by client device 110 for activities 134. Probes 114 may further be associated with computing code that allows for execution of probes 114 via one or more user interfaces in order to receive additional data for activities 134. Using the computing code, probes 114 may be injected to one or more user interfaces displayable by client device 110 (e.g., in the current user interface, in an upcoming user interface for a processing or navigation flow, etc.) by injecting and/or causing the computing code to be injected with computing code for the user interface and corresponding processes. Thereafter, the user interface may be provided to client device by malicious device probing operations via service application 130.

After determining one or more of probes 114 to issue to client device 110 for malicious user detection and providing those probes via one or more user interfaces, service application 130 may receive interactions with one or more user interfaces and/or probes provided and displayed via the user interface(s). These interactions may correspond to further ones of activities 134 for analysis using rules and models 136. Rules and models 136 may include business and/or processing rules with a rules-based engine for determining assessments 138, which indicate whether activities 134 indicate client device 110 is being used by a valid user or a malicious user. For example, the rules-based engine may take activities 134 as input and determine a risk or fraud score that may be compared to a threshold score. If the determined score meets or exceeds an acceptable risk threshold, one or more actions may be taken, including preventative and/or remedial actions that minimize damage that the computing attacks, bots, or scripts may have on service application 130 or other components of service provider server 120. The rules and/or rule-based engine for determining assessments 138 may be determined using device histories 124 for past device activities and malicious or valid activities and responses to probes 114.

In further embodiments, rules and models 136 may include AI models, such as machine learning (ML) or neural network (NN) models. When building ML models for rules and models 136, training data may be used to generate one or more classifiers and provide recommendations, predictions, or other outputs based on those classifications and an AI model. The training data may be used to determine input features for training predictive scores for assessments 138, and whether those scores exceed an acceptable risk threshold. For example, ML models for rules and models 136 may include one or more layers, including an input layer, a hidden layer, and an output layer having one or more nodes, however, different layers may also be utilized. For example, as many hidden layers as necessary or appropriate may be utilized. Each node within a layer is connected to a node within an adjacent layer, where a set of input values may be used to generate one or more output values or classifications. Within the input layer, each node may correspond to a distinct attribute or input data type that is used to train ML models for rules and models 136.

Thereafter, the hidden layer may be trained with these attributes and corresponding weights using an AI algorithm, computation, and/or technique. For example, each of the nodes in the hidden layer generates a representation, which may include a mathematical AI computation (or algorithm) that produces a value based on the input values of the input nodes. The AI algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for ML models for rules and models 136 that attempt to classify whether client device 110 is acting maliciously or being used by a malicious user or predict a risk of fraud score. Thus, when ML models for rules and models 136 are used to perform a predictive analysis and output, the input may provide a corresponding output based on the classifications trained for ML models for rules and models 136.

Thus, ML models for rules and models 136 may be trained by using training data associated with device histories 124, such as past behaviors of devices when responding to probes 114 and other ones of activities 134 resulting from using probes 114. By providing training data to train ML models for rules and models 136, the nodes in the hidden layer may be trained (adjusted) such that an optimal output (e.g., a classification) is produced in the output layer based on the training data. By continuously providing different sets of training data and penalizing ML models for rules and models 136 when the output of ML models for rules and models 136 is incorrect, ML models for rules and models 136 (and specifically, the representations of the nodes in the hidden layer) may be trained (adjusted) to improve its performance in data classification. Adjusting ML models for rules and models 136 may include adjusting the weights associated with each node in the hidden layer. Thus, the training data may be used as input/output data sets that allow for ML models for rules and models 136 to make classifications based on input attributes. The output classifications for an ML model trained for assessments 138 may be classifications of malicious or valid users using different devices with service application 130, such as in response to probes 114.

Additionally, service provider server 120 includes database 122. Database 122 may store various identifiers associated with client device 110. Database 122 may also store account data, including payment instruments and authentication credentials, as well as transaction processing histories and data for processed transactions. Database 122 may store financial information or other data generated and stored by service application 130. Database 122 may also include data and computing code, or necessary components to generate such data and computing code, for probes 144. In this regard, rules and models 136 may also be stored on database 122 for use when performing assessments 138 based on activities 134.

In various embodiments, service provider server 120 includes at least one network interface component 126 adapted to communicate client device 110 over network 140. In various embodiments, network interface component 126 may comprise a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
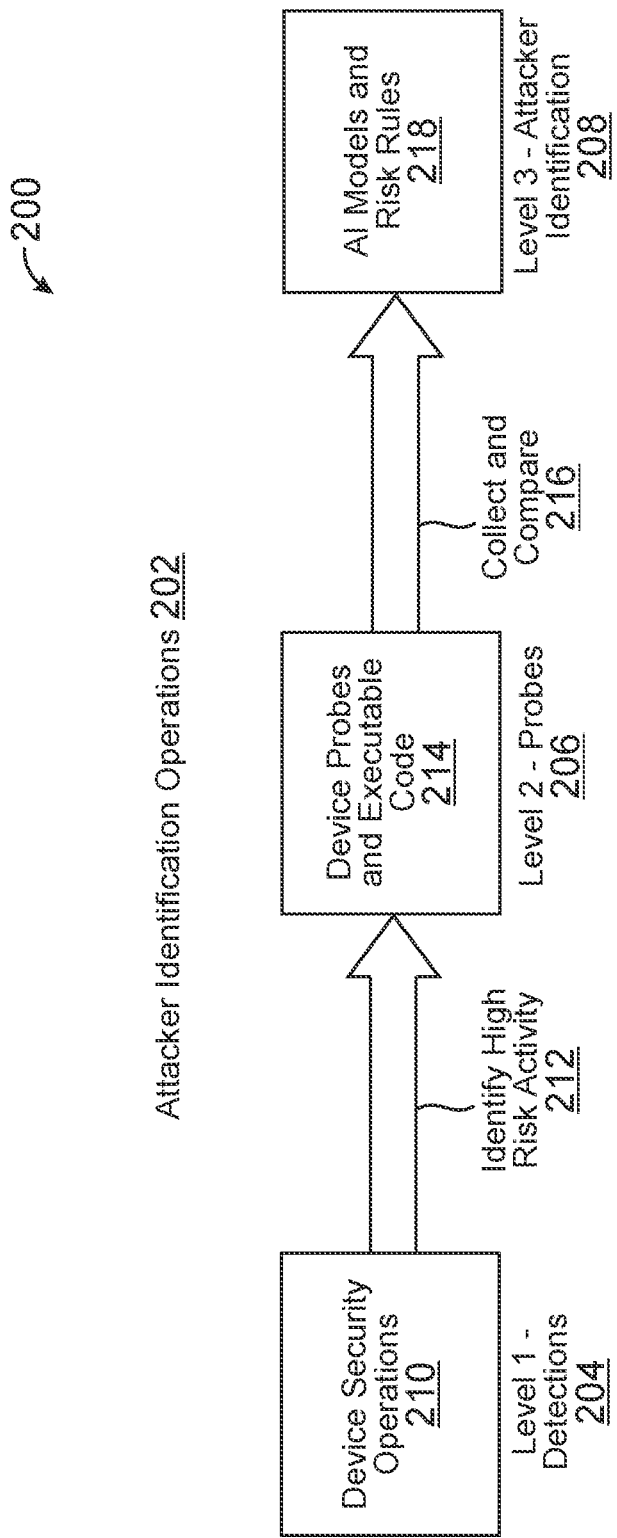
FIG. 2 is an exemplary block diagram of operations used to detect suspicious activities by a computing device and execute probing tests to determine if a malicious user is using the computing device, according to an embodiment.

FIG. 2 is an exemplary block diagram 200 of operations used to detect suspicious activities by a computing device and execute probing tests to determine if a malicious user is using the computing device, according to an embodiment. Diagram 200 includes attacker identification operations 202 that may be performed by service provider server 120 with client device 110 discussed in reference to system 100 of FIG. 1. In this regard, client device 110 may receive probes and tests via user interfaces when injected into computing code and/or script for the user interface.

In diagram 200, attacker identification operations 202 initially begin with level 1—detections 204, proceeds to level 2—probes 206, and ends with a level 3—attacker identification 208. At level 1—detections 204, the executed operations correspond to device security operations 210 that attempt to identify high risk activity 212. For example, one or more monitoring operations may be executed during device security operations 210, which monitor one or more activities by a device. Those activities are then compared to a risk or fraud threshold to identify high risk activity 212. For example, high risk activities may be those that indicate a shell script, automated bot, or other automated attack is being perpetrated against the systems, services, and components of a service provider. The activities used by operations that identify high risk activity 212 may include single activities, such as identification of an executed computing attack, or may correspond to multiple activities that exceed the risk threshold, such as by detecting a possible account enumeration, multiple login attempts, scripted form filling, and the like.

If a high-risk activity is identified during level 1—detections 204, attacker identification operations 202 proceeds to level 2—probes 206, where device probes and executable code 214 are determined. Device probes and executable code 214 may include one or more device probes that are injected into a user interface through executable computing code and are displayed when the user interface is output on a computing device. This may change the appearance, loading, order of interface elements, or the like of the user interface, which may disrupt a scripted attack and/or identify the scripted attack by causing the scripted attack to select legacy interface elements instead of newly displayed interface elements. Once one or more probes are selected from device probes and executable code 214, the corresponding executable computing code is determined and/or retrieved for the probe(s), and the code may be injected and/or executed with computing code for a current or subsequent user interface provided to the suspicious computing device.

Using the probe(s), operations for collect and compare 216 are executed to monitor interactions by the computing device with the provided user interfaces and/or probes within the user interfaces. The interactions may correspond to activities performed by the computing device with the corresponding user interface and/or computing services of the service provider. For example, the computing device may interact with and/or view a probe provided via a user interface (e.g., a web interface or application interface). With human users, this may take additional time or provide additional user input to the user interface. Conversely, with automated attacks, bots, and scripts that proceed according to a coded set of commands (e.g., a shell script), the automated operations may take less time, ignore the probe and/or information, and/or select or enter data to standard interface elements, while ignoring new interface elements.

Thus, after collect and compare 216, the additional activities of the computing device are provided to level 3—attacker identification 208. During level 3—attacker identification 208, AI models and risk rules 218 are executed to determine whether the additional activities indicate that a malicious user is using the computing device to perform an attack on the computing services, resources, and/or components of the service provider. AI models may be used to determine a classification of the device as predicted to be used as a valid or malicious user. In other embodiments, the AI models may generate a predictive risk score for the additional activities, which may be compared to a threshold score. With risk rules, one or more processing rules may be used to analyze the data and similarly determine a risk score that may be compared to a threshold score.

Based on level 3—attacker identification 208, one or more preventative or remedial actions may be taken with the computing device and/or account or processing flow used by the computing device. For example, preventative actions may include preventing further activities, disconnecting or blocking the computing device, retesting the computing device, deploying honeypots to learn more about the computing device and/or malicious user, and the like. Remedial actions may include reverse processed transactions or other data processing requests, blocking an account used by the computing device and/or alerting a valid user to secure the account, identifying and remediating security issues with the computing service, and the like.

FIG. 3A is an exemplary user interface 300a prior to injecting computing code for a probing test to detect if a malicious user is using a computing device, according to an embodiment. User interface 300a of FIG. 3A may be displayed by client device 110 when accessing a user interface for a webpage or dedicated application. In this regard, user interface 300a may be displayed prior to providing a probe via user interface 300a, such as prior to detecting suspicious activities and/or if the activities of client device 110 appear valid (e.g., do not require a probe).

User interface 300a is displayed through client device 110 when accessing a user interface provided by a service provider. In user interface 300a, the service may correspond to one or more web interfaces and/or application interfaces for account creation and/or electronic transaction processing via an online transaction processor corresponding to the service provider. In user interface 300a, different interface fields, menus, and elements are shown, which may be filled out when engaging in account creation and/or electronic transaction processing. For example, user interface 300a includes a create account menu 302, a country menu 304, payment information fields 306, a hidden placeholder field 308 for injection of a probe, billing address fields 310, contact information fields 312, and a security check 314 have a code entry field 316 and a code 318.

When completing the menus, fields, and elements in user interface 300a, a valid human user may select each menu option and/or provide data in each individual field. However, a script may also be used to automatically select menu options and/or provide input into fields quickly and with minimal human interaction. This may allow a malicious user to attempt many different account creations and/or electronic transaction processing requests, which allows a malicious user to quickly engage in fraud before it can be caught and/or attempt many different types and/or combinations of potentially compromised data. For example, even with security check 314 having a CAPTCHA-type test requiring code 318 to be inserted to code entry field 316, more modern computing attacks may still bypass, correctly complete, or otherwise defeat security check 314. Thus, automated bot, scripts, and/or attacks may compromise a service provider's computing services and systems. In order to detect if an automated script is filling out user interface 300*a*, a probe may be inserted at hidden placeholder field 308, as shown in FIG. 3B.

Figure 3B:
FIG. 3B is an exemplary user interface after injecting computing code for a probing test to detect if a malicious user is using a computing device, according to an embodiment.

FIG. 3B is an exemplary user interface 300*b* after injecting computing code for a probing test to detect if a malicious user is using a computing device, according to an embodiment. User interface 300*b* of FIG. 3B may be displayed by client device 110 when accessing a user interface for a webpage or dedicated application. In this regard, user interface 300*b* may be displayed after providing a probe 320 via user interface 300*b*, such as after detecting suspicious activities and/or if the activities of client device 110 appear malicious (e.g., require use of one or more probes to identify an attacker).

User interface 300*b* is displayed through client device 110 when accessing a user interface provided by a service provider. In user interface 300*b*, the service may correspond to one or more web interface and/or application interface for account creation and/or electronic transaction processing via an online transaction processor corresponding to the service provider. User interface 300*b* similarly includes create account menu 302, country menu 304, payment information fields 306, hidden placeholder field 308 with probe 320 currently injected, billing address fields 310, contact information fields 312, and security check 314 have code entry field 316 and code 318.

Activities by client device 110 may have previously been monitored and detected as exceeding a risk threshold, thereby requiring injecting or inserting of probe 320. Probe 320 provides an interesting fact, which may be based on the current processing flow, information about client device 110 (e.g., a transaction or use history, a location, etc.), information about the data entered to the menu and/or fields of user interface 300*b*, or the like, which may be specific to the user associated with client device 110 or more general. Probe 320 selected for a valid human user may be more likely to view and read the interesting fact within probe 320, thereby spending an increased time viewing user interface 300*b*. Similarly, probe 320 may include options 322, that may allow the interesting fact in probe 320 to be output via speakers and/or navigated to additional information about the interesting fact. Thus, a human user may be more likely to select one or more of options 322. However, a script is likely to ignore probe 320 and options 322, thus spending little or no extra time on user interface 300*b*, which may be more indicative of a malicious user and/or attack.

Figure 3C:
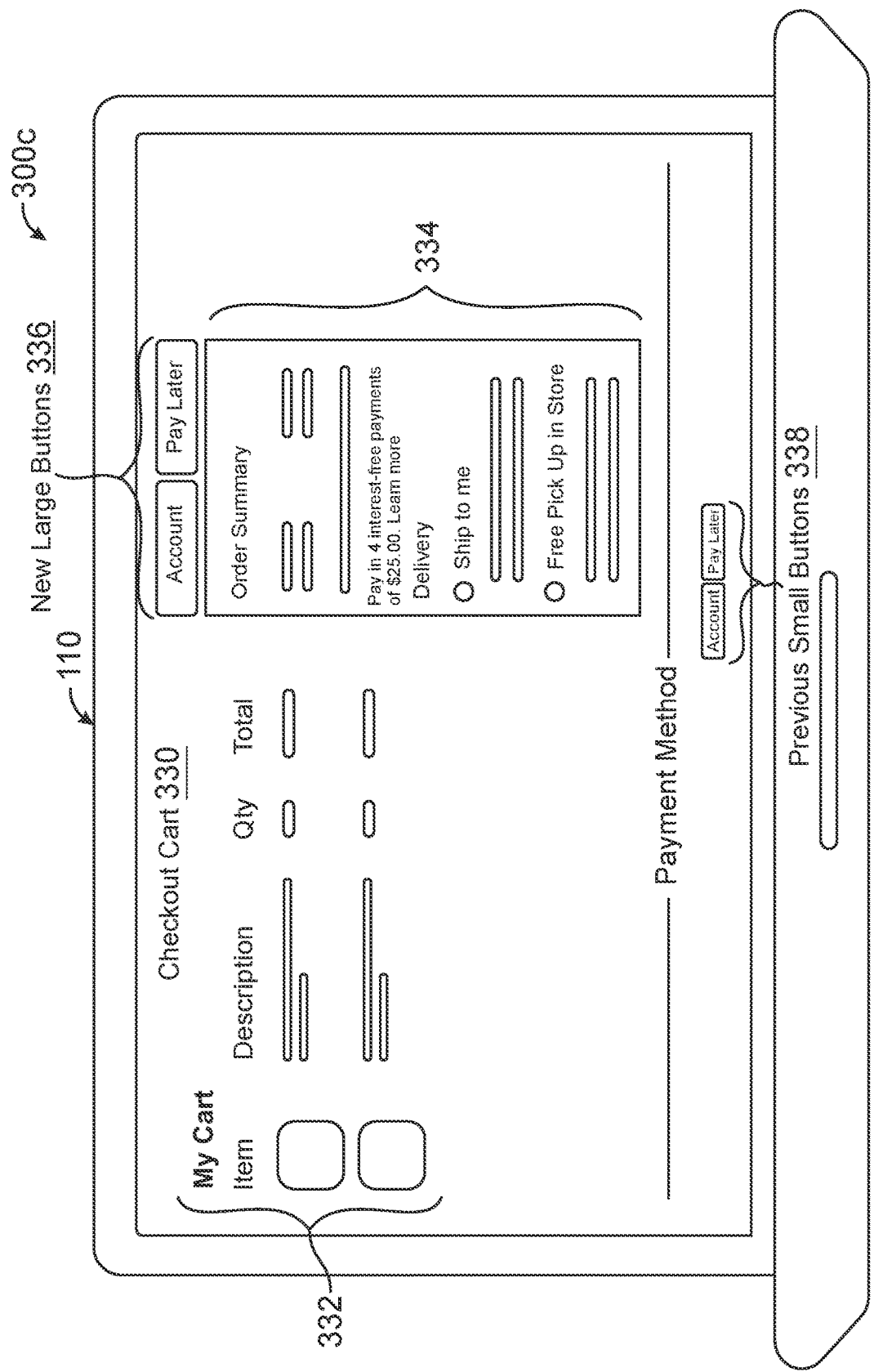
FIG. 3C is an exemplary user interface having injected computing code for an alternative data processing request button used to detect a malicious user, according to an embodiment.

FIG. 3C is an exemplary user interface 300*c* having injected computing code for an alternative data processing request button used to detect a malicious user, according to an embodiment. User interface 300*c* of FIG. 3C may be displayed by client device 110 when accessing a checkout cart 330 from a webpage or dedicated application. In this regard, user interface 300*a* may be displayed when injecting a probe within checkout cart 330 to detect malicious users using checkout cart 330.

User interface 300*c* is displayed through client device 110 when accessing a user interface provided by a service provide for checkout cart 330. In user interface 300*c*, a user may be attempting to pay for a transaction 332 (e.g., one or more items), which may be a malicious user using a script or a valid user that may provide inputs via a mouse, keyboard, touchscreen interface, or the like. In this regard, when viewing transaction 332 for checkout cart 330, an order summary 334 may be required to be completed, such as through selection of options and/or entry of input to fields. For example, order summary 334 may include information about the items in transaction 332 and require entry of delivery information.

To complete checkout, selection of a payment options may be required from new large buttons 336 or previous small buttons 338. In this regard, new large buttons 336 may correspond to a probe where executable buttons to select the payment option are shown in a new location but in a larger area that may be more likely to draw attention. Thus, a human user viewing user interface 300*c* may be more likely to select new large buttons 336 when completing checkout. However, previous small buttons 338 may correspond to the commonly used or previous layout of user interface 300*c*. For example, in the HTML, XML, or application code, previous small buttons 338 may be in the expected interface and code location.

Thus, an attacker, malicious user, and/or script may be more likely to select one of previous small buttons 338. This may be due to the script being coded to identify previous small buttons 338 in the interface location or computing code in the expected location. By injecting computing code (e.g., HTML, XML, or application code) for the probe corresponding to new large buttons 336 to the computing code for user interface 300*c*, a script may not identify that new large buttons 336 are selectable and instead select previous small buttons 338. This therefore may identify the activities of valid users (e.g., those selecting new large buttons 336) and malicious users (e.g., those selecting previous small buttons 338).

Figure 4:
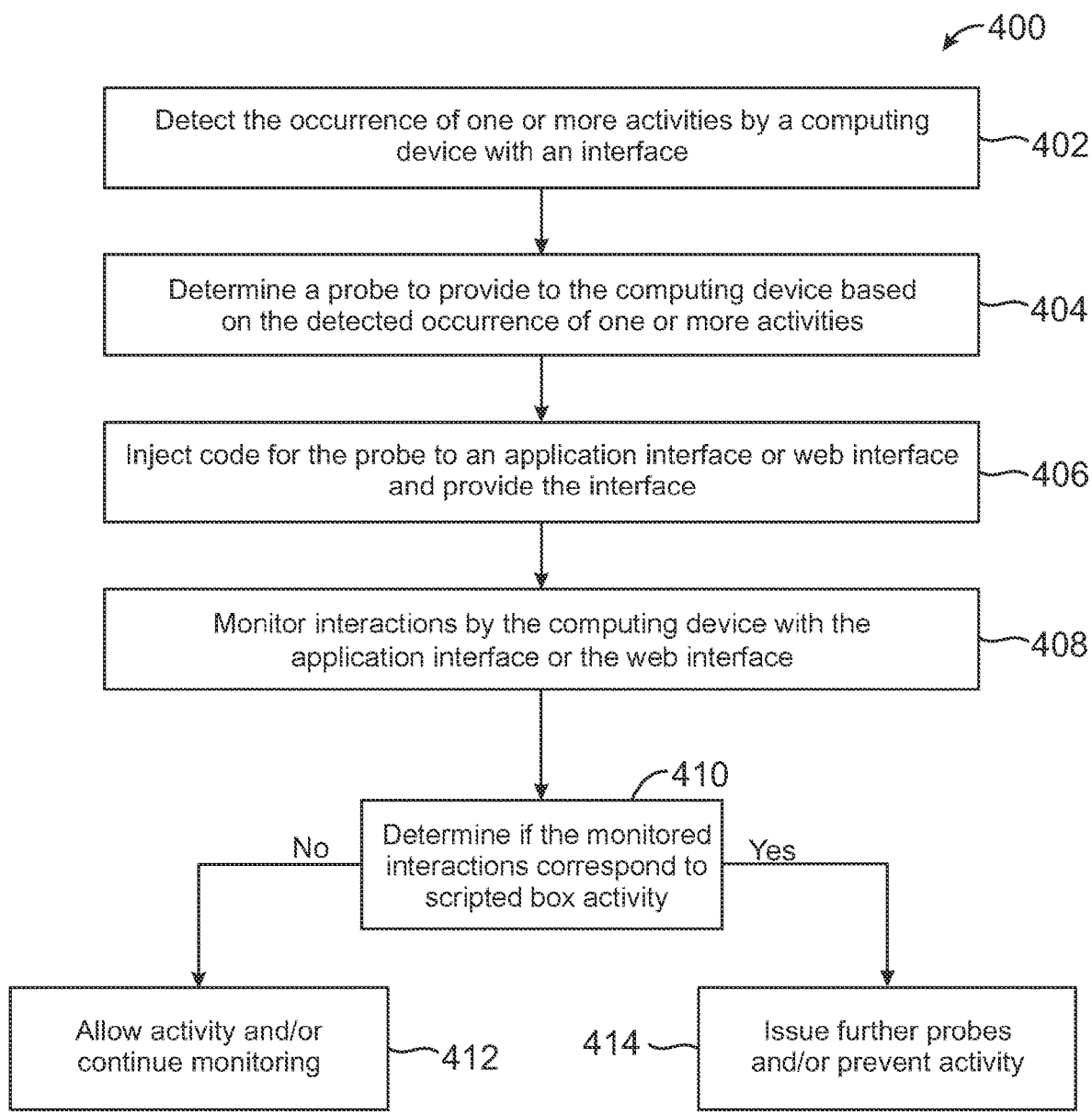
FIG. 4 is a flowchart for injecting computing code for detection of malicious computing attacks during suspicious device behavior, according to an embodiment.

FIG. 4 is a flowchart 400 for injecting computing code for detection of malicious computing attacks during suspicious device behavior, according to an embodiment. Note that one or more steps, processes, and methods described herein of flowchart 400 may be omitted, performed in a different sequence, or combined as desired or appropriate.

At step 402 of flowchart 400, an occurrence of one or more activities by a computing device is detected. The one or more activities may be monitored and detected, which may be compared to a risk threshold. If those activities exceed the risk threshold, they may be deemed suspicious or high-risk activities. In one embodiment, a single activity may be detected that is high-risk, such as detection of a computing attack or execution of a shell script. In another embodiment, a number of occurrences of one or more activities may be determined to meet or exceed a risk threshold (e.g., a number of failed logins). At step 404, a probe to provide to the computing device is determined based on the detected occurrence of the one or more activities. For example, a probe may be used to detect malicious activity if the detected occurrence meets or exceeds the risk threshold. Thus, the probe may be determined in response to the one or more activities being identified as high-risk or suspicious. The probe may correspond to a test, relevant information, a selectable button, a rearrangement of interface fields or elements, a banner or other loadable object (e.g., that may increase interface loading time), or the like, which may be used to detect automated activities, confuse or crash automated scripts or bots, and/or detect human activities.

For example, a probe may be variations of interface layouts and construction, animated or static images, changing selectable buttons including adding or making invisible, changing interface elements and layouts, and the like. Other probes may include varying processing and/or navigation flows, redirecting to another user interface, and/or outputting required or important data or data entry fields in a secondary interface, such as an iframe. A probe may also change input component icons and/or interface icons, such as by moving or changing an interface focus, adjusting or moving a mouse cursor or icon, changing mouse speed, adding a tracking pixel, and the like. Additionally, relevant or interesting information may also be used for probes, such as by providing a test or quiz, adding a puzzle, or providing interesting or relevant information in the user interface or a secondary user interface.

Once a probe is determined, at step 406, code is injected for the probe to an application interface or web interface, such as one accessed or accessible by the computing device, and the interface is provided. The code may be injected by providing the code in a specific or placeholder location in the user interface, such as a specific or placeholder line in computing code for the user interface. At step 408, an interaction by the computing device with the application interface or web interface is monitored. For example, the computing device may interact directly with the probe, may ignore the probe, or may interact with other portions and elements of the provided interface having the probe. In other embodiments, inferred interactions may occur with the probe, such as if the computing device spends longer on the user interface when a human user may be inferred to be reading the probe. Therefore, in certain embodiments, the interactions by the computing device with the application or web interface (including the probe) is monitored, and in other embodiments, interactions by the computing device with the probe itself (including inferred interactions) may be monitored.

For example, in some embodiments, certain activities by the computing device may be monitored overall with the interface currently being displayed. With a scripted attack, the activities may be the same as those detected at step 402 when the script continues executing or repeats (e.g., with an account enumeration attack). In such embodiments, a probe may be deployed that never or rarely receives an interaction and/or input based on the scripted attack being executed (e.g., the script ignores the probe deployed in the interface). Thus, no interactions with the probe may occur and instead the interactions with the interface may be monitored. In other embodiments, the probe may include HTML or XML code that causes the script to break, and thus, causes an interaction by the script with the probe and/or input to the probe. This may include adding a probe that includes an interface field that causes a script to provide information and/or adjusting the placement of interface fields for the entry of data.

The interaction may also be subtler. For example, a human may take a longer time reviewing a page, and/or providing inputs to an interface, that may include a probe having information of relevance or interest to a human user. Therefore, the probe may cause a longer wait or review time on the interface that is being loaded and/or displayed. In contrast to a human user, a script may immediately advance the interface when displayed (e.g., using a navigation tool and/or after input by the script), which may demonstrate that an automated bot is performing interface input and/or navigation. Conversely with other probes, a script may also break and/or require longer loading times when a transparent or invisible probe is displayed (e.g., one having a new interface field or element that is not visible to a human user), and thus may indicate a script is being used with the displayed interface in place of human activity. Thus, other activities may also be monitored, such as the interaction with the probe, activities in the provided interface, and the like.

At step 410, it is determined if the monitored interactions correspond to scripted bot activity. During step 410, the interactions by the computing device with the probe may be compared to a baseline or threshold of human activities and/or automated attacker activities. This may utilize a rules-based engine based on processing rules for the additional activities. In further embodiments, an AI model and engine, such as an ML model trained to detect or predict human behavior and activities and/or malicious or automated behavior and activities, may be used to predict whether the interactions are human or scripted. If, at step 410, the interactions are determined to be human and not scripted bot activity, then at step 412, the activity of the computing device is allowed and/or monitoring is continued. Monitoring may be continued to avoid false positives and further detect malicious users. However, if, at step 410, the interactions are determined to be scripted, then at step 414 further probes are issued and/or one or more activities is prevented. This may include taking the preventative and/or remedial actions described herein with the malicious user.

Figure 5:
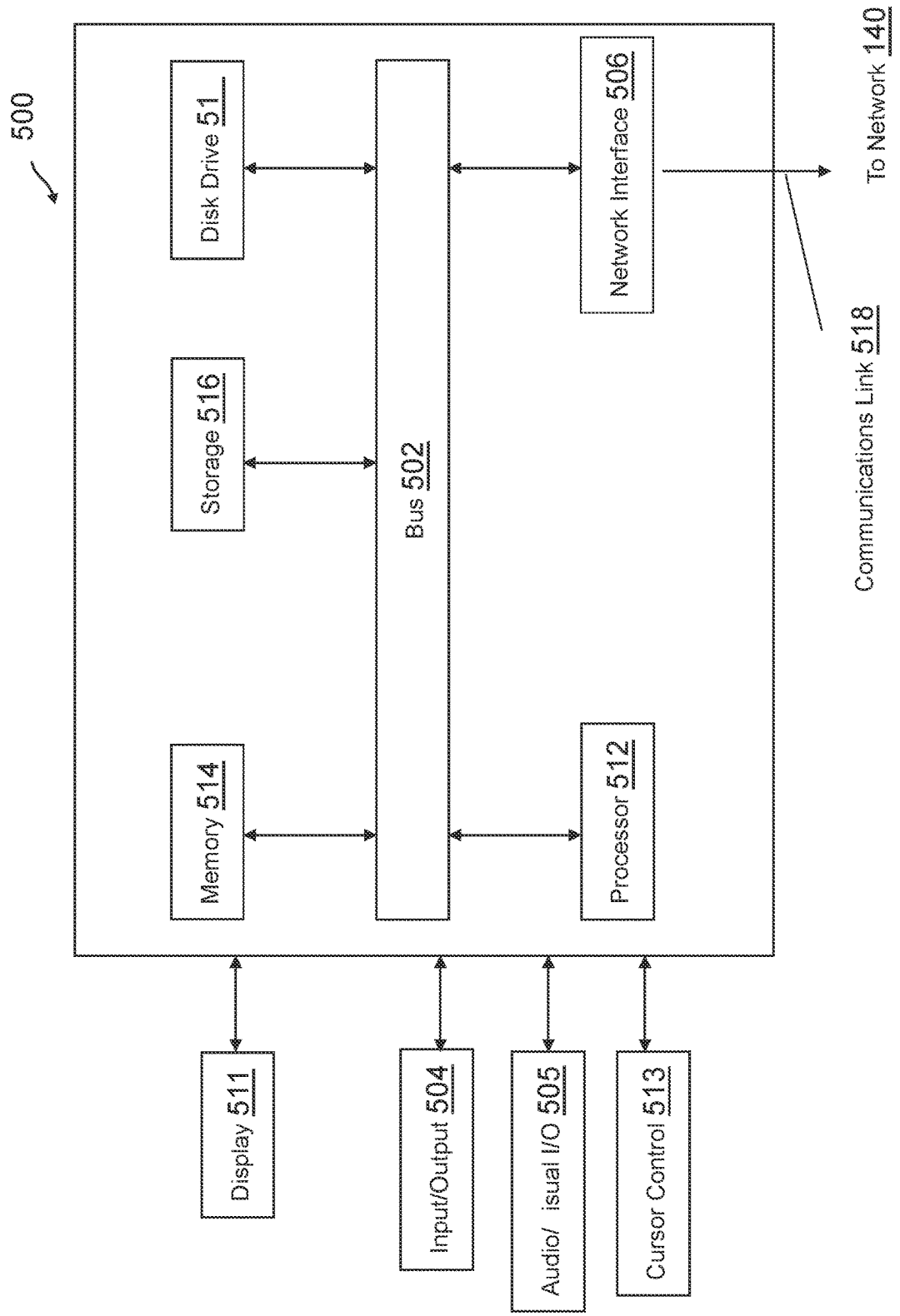
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s)

512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:
a non-transitory memory; and
one or more hardware processors coupled to the non-transitory memory and configured to read instructions from the non-transitory memory to cause the service provider system to perform operations comprising:
   detecting one or more first activities by a computing device with the service provider system that indicate a potential fraudulent activity or a computing attack on the service provider system, wherein the detecting is at least partially based on determining that the one or more first activities exceed a risk threshold;
   identifying that the potential fraudulent activity or the computing attack is associated with a scripted computing process perform by executing a script;
   determining a variation of the processing flow that causes a redirection to a web interface or an application interface to be provided to the computing device in association with the one or more first activities, wherein the variation changes user interfaces provided for the one or more first activities during the processing flow;
   determining a first probing test of the computing device based on the scripted computing process and the variation, wherein the first probing test includes injecting a first computing code into existing code for the processing flow;
   injecting the first computing code for the first probing test into the existing code;
   providing the web interface or the application interface to the computing device;
   monitoring one or more second activities corresponding to a first interaction between a user of the computing device and the provided web interface or the provided application interface, wherein the one or more second activities are monitored to determine whether an input made to the web interface or the application interface after the redirection is consistent with an interface element newly presented on the web interface or the application interface during the processing flow; and
   determining, based on the monitoring, whether to flag the user of the computing device as a malicious user.

2. The service provider system of claim 1, wherein the operations further comprise:
   in response to determining to flag the user as the malicious user based on the monitoring, determining a second probing test of the computing device, wherein the second probing test includes injecting a second computing code into the existing code;
   injecting second computing code for the second probing test into the existing code;
   providing the web interface or the application interface to the computing device; and monitoring one or more third activities corresponding to a second interaction between the user of the computing device and the provided web interface or the provided application interface.

3. The service provider system of claim 2, wherein the operations further comprise:
determining whether to flag the user of the computing device as the malicious user is further based on the monitored one or more third activities corresponding to the second interaction.

4. The service provider system of claim 3, wherein the operations further comprise:
executing at least one remedial action with the computing device based on determining that the one or more third activities corresponding to the second interaction flag the user as the malicious user, wherein the at least one remedial action comprises at least one of blocking an account used by the computing device with the service provider system, preventing an action executing by the computing device with the service provider system, disconnecting the computing device with the service provider system, issuing one or more retests of the computing device with the service provider system, further monitoring the computing device, or deploying a honeypot trap that determines an identity of the malicious user associated with the computing device.

5. The service provider system of claim 1, wherein the first probing test is further based on at least one of a variation to a previous interface layout, a variation to a current interface layout, a computing macro that replays a display output, a movement of an interface focus, a change of a mouse speed, a tracking pixel, or a data output via a secondary interface.

6. The service provider system of claim 1, wherein the injecting the first computing code comprises inserting hypertext markup language (HTML) or extensible markup language (XML) code to code for a webpage associated with the web interface, adding interface data to the application interface, or executing the first computing code within an iframe displayed by the computing device.

7. The service provider system of claim 1, wherein the detecting the one or more first activities comprises detecting the script is being executed by a dedicated software application or a rich Internet application provided by the service provider system.

8. The service provider system of claim 7, wherein the scripted computing process comprises one of a brute force login attempt, an automatic form filler, or a sequential login attempt.

9. The service provider system of claim 1, wherein the operations further comprise:
in response to determining that the one or more second activities corresponding to the first interaction do not flag the user as the malicious user, authorizing the computing device for further activities with the service provider system.

10. The service provider system of claim 9, wherein determining that the one or more second activities corresponding to the first interaction do not flag the user as the malicious user is based on an artificial intelligence model trained from human activities and human responses to the first probing test.

11. The service provider system of claim 9, wherein the operations further comprise
detecting one or more third activities by the computing device with the service provider system; and
executing a second probing test of the computing device that determines whether the first probing test resulted in a false positive that the one or more second activities corresponding to the first interaction do not flag the user as the malicious user.

12. A method comprising:
detecting, by a service provider server, that activity conducted via a device with a processing flow for a website or an application meets or exceeds a malicious behavior threshold;
identifying that the malicious behavior threshold is associated with a scripted computing process;
determining a variation of the processing flow that causes a redirection to a webpage of the website or an interface of the application to be provided to the computing device in associated with the activity, wherein the variation changes user interfaces provided for the activity during the processing flow;
determining, by the service provider server, a probe that tests the device for a usage by a malicious actor based on the scripted computing process and the variation, wherein the probe comprises a computing code that introduces the variation to code for the website or the application when executed with the website or the application by the service provider server;
injecting, by the service provider server, the computing code for the probe to the code for the website or the interface of the application for an execution with the device;
detecting, by the service provider server, a response to the probe based on the execution of the computing code by the device; and
determining that the response to the probe indicates that the malicious actor is utilizing the device, wherein the determining is based on whether an input made to the webpage or the interface after the redirection is consistent with an interface element newly presented on the webpage or the interface during the processing flow.

13. The method of claim 12, further comprising:
monitoring, by the service provider server, additional activity by the device with the one of the website or the application based on the determining that the response to the probe indicates that the malicious actor is utilizing the device.

14. The method of claim 13, further comprising:
determining, by the service provider server, an additional probe for the device; and
injecting, by the service provider server, additional computing code for the additional probe to the code for the website or the interface of the application.

15. The method of claim 14, further comprising:
detecting, by the service provider server, an additional response to the additional probe; and
preventing the additional activity by the device with the website or the application.

16. The method of claim 12, wherein the activity is associated with at least one of multiple failed login attempts, an automated computing script execution, an interface field form filling, data from blacklisted IP addresses, or CAPTCHA responses.

17. The method of claim 12, wherein the probe further includes one of a responsive test in the website or the interface of the application, a change of content within the website or the interface of the application, or a time-based challenge on the website or the interface of the application.

18. The method of claim 12, wherein the determining that the response to the probe indicates that the malicious actor is utilizing the device is based on an artificial intelligence (AI) model trained using human responses to at least the probe.

19. A non-transitory machine-readable medium having stored thereon machine-readable instructions executable to cause a machine to perform operations comprising:

receiving behavioral indications for computing devices when malicious activities are performed with a processing flow of a service provider;

receiving a threshold trigger to test the computing devices based on the behavioral indications, wherein the threshold trigger tests the computing devices for being operated by a malicious user or a bot script to perform the malicious activities with the service provider when the threshold trigger is met or exceeded;

receiving a plurality of probing tests for the computing devices that identify whether the computing devices are being operated by the malicious user or the bot script to perform the malicious activities with the service provider, wherein the plurality of probing tests include at least one comparison threshold required to be met or exceeded to identify the computing devices as being operated by the malicious user or the bot script;

determining a variation of the processing flow that causes a redirection to a web interface or an application interface to be provided to the computing devices in place of a preestablished web interface or a preestablished application interface for the processing flow, wherein the variation changes a preexisting order of user interfaces provided during the processing flow;

establishing an attacker identification system comprising the plurality of probing tests with the behavioral indications and the threshold trigger, wherein at least one of the plurality of probing tests using the variation of the processing flow; and deploying the attacker identification system with the service provider.

20. The non-transitory machine-readable medium of claim 19, wherein the operations further comprise:

monitoring for the malicious user or the bot script using the attacker identification system;

detecting at least one of the behavioral indications from a computing device; and executing at least one of the plurality of probing tests with the computing device.

* * * * *